United States Patent
Lee et al.

(10) Patent No.: US 10,337,609 B2
(45) Date of Patent: Jul. 2, 2019

(54) CLUTCH CONTROL IN A CONTINUOUSLY VARIABLE TRANSMISSION

(71) Applicant: GM GLOBAL TECHNOLOGY OPERATIONS LLC, Detroit, MI (US)

(72) Inventors: Chunhao J Lee, Troy, MI (US); Dongxu Li, Troy, MI (US); Farzad Samie, Franklin, MI (US); Chi-kuan Kao, Troy, MI (US); Kumar V Hebbale, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 303 days.

(21) Appl. No.: 15/289,454

(22) Filed: Oct. 10, 2016

(65) Prior Publication Data

US 2018/0100580 A1   Apr. 12, 2018

(51) Int. Cl.
| | |
|---|---|
| F16H 61/70 | (2006.01) |
| F16H 61/662 | (2006.01) |
| F16H 9/18 | (2006.01) |
| F16H 59/50 | (2006.01) |
| F16H 61/12 | (2010.01) |

(52) U.S. Cl.
CPC .......... *F16H 61/662* (2013.01); *F16H 9/18* (2013.01); *F16H 61/66272* (2013.01); *F16H 61/702* (2013.01); *F16H 2059/506* (2013.01); *F16H 2061/122* (2013.01)

(58) Field of Classification Search
None
See application file for complete search history.

(56) References Cited

U.S. PATENT DOCUMENTS

| | | | |
|---|---|---|---|
| 5,672,132 A * | 9/1997 | Schwab | B60W 10/02 192/103 F |
| 6,471,022 B1 | 10/2002 | Goebel et al. | |
| 6,567,733 B2 | 5/2003 | Popp et al. | |

(Continued)

FOREIGN PATENT DOCUMENTS

| | | |
|---|---|---|
| JP | H102390 A | 1/1998 |
| JP | 201108055 A | 4/2001 |

OTHER PUBLICATIONS

US Application Filing date Oct. 13, 2016, U.S. Appl. No. 15/303,781, Applicant: GM Global Technology Operations LLC; Title: Transmission for a Powertrain.

(Continued)

*Primary Examiner* — Jacob S. Scott (57) ABSTRACT

A continuously variable transmission, a transmission control system, and a method is provided. The control system is configured to determine whether a predetermined condition is met for applying a clutch critical pressure to an applied clutch. The clutch critical pressure is less than line pressure and is a pressure at which the clutch may slip upon experiencing a predetermined torque disturbance level. The control system is configured to command the clutch critical pressure to be applied to the clutch if the predetermined condition is met. The control system is further configured to determine whether the clutch is slipping beyond a predetermined threshold, and if the clutch is slipping beyond the predetermined threshold, command a clutch slip control scheme to be applied to the clutch that is configured to bring a clutch slip of the clutch under the predetermined threshold.

17 Claims, 4 Drawing Sheets

(56) References Cited

U.S. PATENT DOCUMENTS

| | | | |
|---|---|---|---|
| 6,730,001 B1 | 5/2004 | Vohmann et al. | |
| 6,769,526 B2 | 8/2004 | Iida et al. | |
| 6,801,845 B2 | 10/2004 | Henneken et al. | |
| 6,974,009 B2 | 12/2005 | Hoshiya et al. | |
| 7,130,732 B2 | 10/2006 | Spoerl et al. | |
| 7,140,990 B2 | 11/2006 | Sawada et al. | |
| 7,188,717 B2 | 3/2007 | Hoshiya et al. | |
| 7,225,071 B2 | 5/2007 | Akaike | |
| 7,366,601 B2 | 4/2008 | Ayabe et al. | |
| 7,509,203 B2 | 3/2009 | Imamura et al. | |
| 7,678,016 B2 | 3/2010 | Nakayama | |
| 7,769,517 B2 | 8/2010 | Segawa et al. | |
| 7,769,518 B2 | 8/2010 | Segawa et al. | |
| 8,150,585 B2 | 4/2012 | Hinami et al. | |
| 8,165,766 B2 | 4/2012 | Mueller et al. | |
| 8,296,023 B2 | 10/2012 | Kojima et al. | |
| 8,392,082 B2 | 3/2013 | Yamada | |
| 8,406,969 B2 | 3/2013 | Shimozato | |
| 8,491,443 B2 | 7/2013 | Hofler et al. | |
| 8,585,544 B2 | 11/2013 | Honda | |
| 8,768,590 B2 | 7/2014 | Tsukamoto et al. | |
| 8,775,036 B2 | 7/2014 | Inoue | |
| 8,814,741 B2 | 8/2014 | Kikura et al. | |
| 8,825,321 B2 | 9/2014 | Dohi et al. | |
| 8,954,247 B2* | 2/2015 | Kushiyama | F16H 61/66272 701/60 |
| 9,482,328 B2 | 11/2016 | Kao et al. | |
| 9,482,329 B2 | 11/2016 | Kao et al. | |
| 9,989,146 B1* | 6/2018 | Abington | F16H 61/0021 |
| 2003/0069682 A1* | 4/2003 | Iwatsuki | F16H 61/143 701/51 |
| 2003/0150683 A1* | 8/2003 | Hoshiya | F16D 48/066 192/3.57 |
| 2004/0242370 A1* | 12/2004 | Iwatsuki | F16H 61/66272 477/45 |
| 2007/0184936 A1* | 8/2007 | Nakayama | F16H 61/66272 477/44 |
| 2016/0123448 A1 | 5/2016 | Samie et al. | |

OTHER PUBLICATIONS

US Application Filing date Aug. 7, 2015 U.S. Appl. No. 14/820,746, Applicant: GM Global Technology Operations LLC; Title: Continuously Variable Transmission.

US Application Filing date Nov. 8, 2016, U.S. Appl. No. 15/346,349, Applicant: GM Global Technology Operations LLC; Title: Control of a Continuously Variable Transmission Using Fast Fourier Transformation.

International Patent Application Filing date Apr. 11, 2016, Application No. PCT/CN2016/078953, Applicant: GM Global Technology Operations LLC; Title: CVT with fixed ratio using layshaft gearsets and dog clutches.

International Patent Application Filing date Apr. 11, 2016, Application No. PCT/CN2016/078952, Applicant: GM Global Technology Operations LLC; Title: Power-Split 2-Mode CVT.

US Application Filing date Sep. 6, 2016, U.S. Appl. No. 15/256,808, Applicant: GM Global Technology Operations LLC; Title: Continuously Variable Transmission and System and Method of Control for High Torque Events.

* cited by examiner

# CLUTCH CONTROL IN A CONTINUOUSLY VARIABLE TRANSMISSION

TECHNICAL FIELD

The present disclosure pertains to a continuously variable transmission (CVT), a transmission control system, and a method for controlling a forward clutch of the CVT.

INTRODUCTION

A continuously variable transmission (CVT) is a type of power transmission that is capable of continuously changing an output/input speed ratio over a range between a minimum (underdrive) ratio and a maximum (overdrive) ratio, thus permitting an infinitely variable selection of engine operation that can achieve a preferred balance of fuel consumption and engine performance in response to an output torque request. Unlike conventionally-geared transmissions that use one or more planetary gear sets and multiple rotating and braking friction clutches to establish a discrete gear state, a CVT uses a variable-diameter pulley system to achieve the infinitely variable selection of gear ratios.

The pulley system, which is commonly referred to as a variator assembly, can transition anywhere within the calibrated range of speed ratios. A typical belt-type or chain-type variator assembly includes two variator pulleys interconnected via an endless rotatable drive element, such as a drive chain or belt. The endless rotatable drive element rides within a variable-width gap defined by conical pulley faces. One of the variator pulleys receives engine torque via a crankshaft, torque converter, and an input gear set, and thus acts as a driving/primary pulley. The other pulley is connected via additional gear sets to an output shaft of the CVT and thus acts as a driven/secondary pulley. One or more planetary gear sets may be used on the input or output sides of the variator assembly. For example, a planetary gear set may be used on the input side with forward and reverse clutches to change direction, depending on the configuration.

In order to vary a CVT speed ratio and to transfer torque to the drivetrain, a clamping force (applied through hydraulic pressure) may be applied to one or both of the variator pulleys via one or more pulley actuators. The clamping force effectively squeezes the pulley halves together to change the width of the gap between pulley faces. Variation of the gap size, i.e., the pitch radius, causes the rotatable drive element to ride higher or lower within the gap. This, in turn, changes the effective diameters of the variator pulleys and may vary the speed ratio of the CVT. A clamping force may also be applied to transfer a desired amount of torque from one pulley to another through the continuous member, where the amount of clamping force applied is intended to prevent the continuous member from slipping on the pulleys.

A CVT control system can be programmed to respond to outside events, such as wheel slip or other events that create the need for a high torque carrying capacity by the CVT continuous member. For example, when the wheels are slipping, this may be an indication that the variator assembly will soon require additional torque carrying capacity due to a spike or disturbance in output torque. Accordingly, a CVT control system may apply a maximum clamping pressure to the CVT pulleys when detecting wheel slip, to prevent the continuous member from slipping. Such maximum clamping pressure, however, has a negative effect on fuel economy.

SUMMARY

The present disclosure provides a control system that adjusts pressure to an applied clutch to allow the clutch to slip during a transient event to prevent the pulley system from slipping in an optimal control mode. A control scheme is then applied to bring the clutch slip back to a threshold. In some forms, a higher rough road clutch pressure can be applied if the vehicle is undergoing a rough road condition, which still allows the clutch to slip before the pulley system would slip.

In one form, which may be combined with or separate from the other forms disclosed herein, a method for controlling a CVT applied clutch of a continuously variable transmission (CVT) including a variator assembly for a motor vehicle is provided. The method include a step of determining whether a predetermined condition is met for applying a clutch critical pressure to the CVT clutch, the clutch critical pressure being less than a line pressure, the clutch critical pressure being a pressure at which the CVT clutch may slip upon experiencing a predetermined minimum torque level. The method also includes a step of commanding the clutch critical pressure to be applied to the CVT clutch if the predetermined condition is met. The method further includes a step of determining whether the CVT clutch is slipping beyond a predetermined threshold, and the method includes commanding a clutch slip control scheme to be applied to the CVT clutch that is configured to bring a clutch slip of the CVT clutch under the predetermined threshold if the CVT clutch is slipping beyond the predetermined threshold.

In another form, which may be combined with or separate from the other forms disclosed herein, a transmission control system for controlling a CVT applied clutch of a continuously variable transmission (CVT) having a variator assembly is provided. The transmission control system includes an instruction set, the instruction set executable to: determine whether a predetermined condition is met for applying a clutch critical pressure to the CVT clutch, the clutch critical pressure being less than a line pressure, the clutch critical pressure being a pressure at which the CVT clutch may slip upon experiencing a predetermined minimum torque level; command the clutch critical pressure to be applied to the CVT clutch if the predetermined condition is met; determine whether the CVT clutch is slipping beyond a predetermined threshold; and, if the CVT clutch is slipping beyond the predetermined threshold, command a clutch slip control scheme to be applied to the CVT clutch that is configured to bring a clutch slip of the CVT clutch under the predetermined threshold.

In yet another form, which may be combined with or separate from the other forms disclosed herein, a continuously variable transmission (CVT) for a motor vehicle is provided. The CVT includes a variator assembly including a first pulley and a second pulley. The first and second pulleys are rotatably coupled by a continuous rotatable device, wherein the first pulley is rotatably coupled to an input member through a clutch, and the second pulley is rotatably coupled to an output member. The first pulley includes a first moveable sheave that is translatable along a first axis relative to a first stationary sheave in response to urging of a first actuator. The second pulley includes a second moveable sheave that is translatable along a second axis relative to a second stationary sheave in response to urging of a second actuator. The CVT includes a control system having at least one controller and one or more sensors in communication with the controller.

The control system of the CVT includes an instruction set, wherein the instruction set is executable to: determine whether a predetermined condition is met for applying a clutch critical pressure to the clutch, the clutch critical pressure being less than a line pressure, the clutch critical pressure being a pressure at which the clutch may slip upon experiencing a predetermined minimum torque level; command the clutch critical pressure to be applied to the clutch if the predetermined condition is met; determine whether the clutch is slipping beyond a predetermined threshold; and if the clutch is slipping beyond the predetermined threshold, command a clutch slip control scheme to be applied to the clutch that is configured to bring a clutch slip of the clutch under the predetermined threshold.

Additional features may optionally be included with the disclosed method, controller, control system, and/or CVT, such as: the method or controller/control system/CVT being configured to, or having a control logic to, activate a slip recovery decay timer; the method or controller/control system/CVT being configured to, or having a control logic to, implement a feedback control scheme within a decay timeframe bound by the slip recovery decay timer; wherein implementing the feedback control scheme includes implementing a proportional-integral-derivative (PID) control scheme to bring the clutch slip of the CVT clutch under the predetermined threshold within the decay timeframe; wherein the predetermined condition includes at least one of the following: the CVT being in an optimal clamping control mode and an auxiliary pump being on; the method or controller/control system/CVT being configured to, or having a control logic to, determine a rough road status of the vehicle; wherein the predetermined condition further includes the rough road status being negative; the clutch critical pressure being a clutch critical low pressure; the method or controller/control system/CVT being configured to, or having a control logic to, command a clutch critical high pressure to be applied to the CVT clutch if the rough road status of the vehicle is positive and the predetermined condition is met; the clutch critical high pressure being greater than the clutch critical low pressure and less than the line pressure; the clutch critical high pressure being a pressure at which the CVT clutch may slip upon experiencing a predetermined medium torque level; the predetermined medium torque level being greater than the predetermined minimum torque level; wherein a positive rough road status includes at least one of the following: a predetermined number of bumps in a bump threshold timeframe; a wheel slip magnitude exceeding a wheel slip magnitude threshold for longer than a holding timeframe; a predetermined number of wheel slip detections in a rough road timeframe, the wheel slip detections being instances wherein the wheel slip magnitude exceeds the wheel slip magnitude threshold, and vehicle acceleration exceeding a predetermined acceleration threshold; and wherein the transmission control system is configured to command the clutch critical pressure to be applied to the clutch by maintaining the clutch critical pressure through applying a slip feedback control.

Further aspects, advantages and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the disclosure in any manner.

Figure 1:
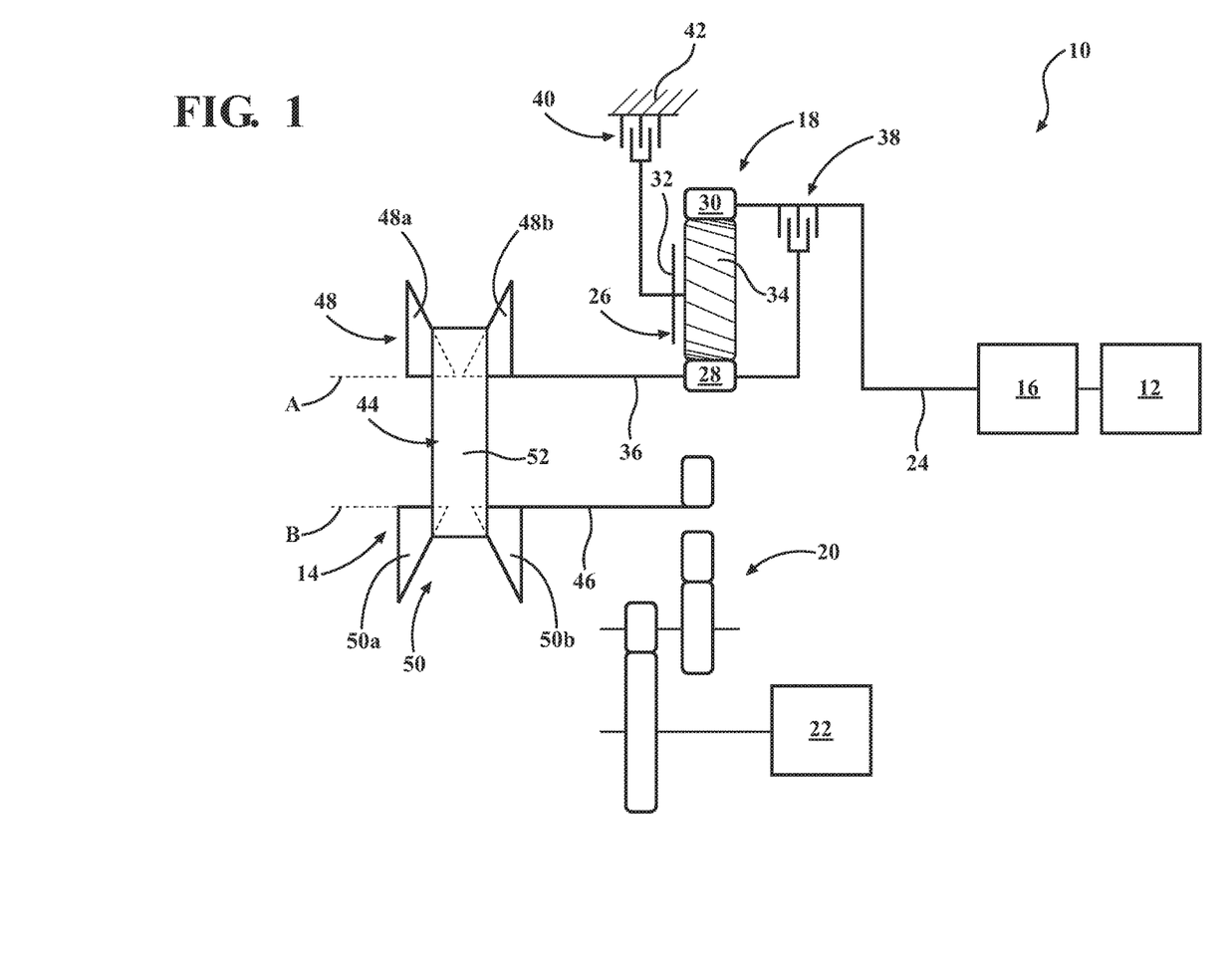
FIG. 1 is a schematic diagrammatic illustration of a motor vehicle propulsion system that includes an internal combustion engine rotatably coupled to a continuously variable transmission (CVT) assembly, in accordance with the principles of the present disclosure.
Figure 2:
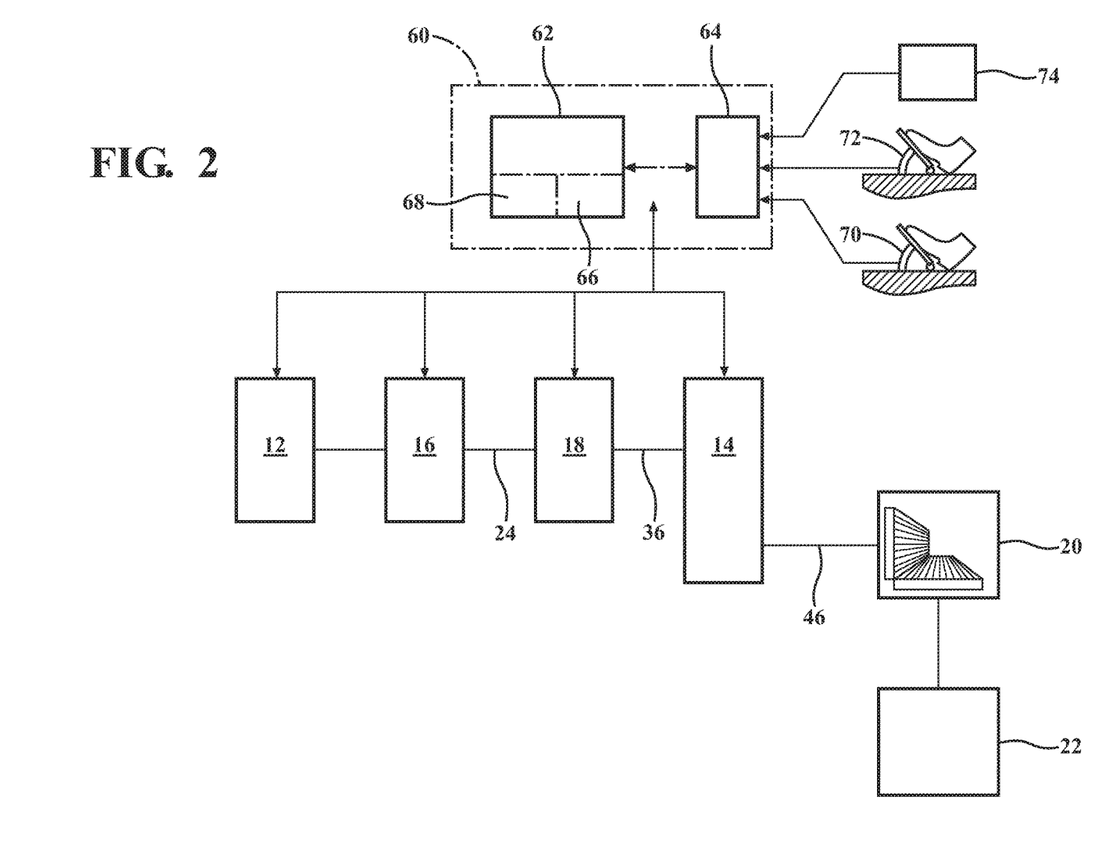
FIG. 2 is a schematic illustration of the motor vehicle propulsion system shown in FIG. 1, including a control system for controlling aspects of the motor vehicle propulsion system, according to the principles of the present disclosure.

Referring now to the drawings, wherein like reference numbers correspond to like or similar components throughout the several figures, FIGS. 1 and 2 schematically illustrates elements of a motor vehicle propulsion system 10 that includes an engine 12, such as an internal combustion engine, rotatably coupled to a continuously variable transmission (CVT) 14 via a torque converter 16 and a forward-reverse switching mechanism 18. The motor vehicle propulsion system 10 is coupled via a driveline 20 to a set of motor vehicle wheels 22 to provide tractive effort when employed on a vehicle. A gearbox (not shown) may also be included upline or downline of the CVT 14 for additional gearing options. Operation of the motor vehicle propulsion system 10 may be monitored and controlled by a control system 60 (see FIG. 2) in response to driver commands and other vehicle operation factors. The motor vehicle propulsion system 10 may be part of a device which may be a vehicle, a robot, farm implement, sports-related equipment or any other transportation device.

The engine 12 may be any suitable engine, such as an internal combustion engine capable of transforming hydrocarbon fuel to mechanical power to generate torque in response to commands originating from the control system 60. The engine 12 may also or alternatively include an electric motor (not shown). The torque converter 16 may be a device providing fluidic coupling between its input and output members for transferring torque. In alternative examples, the torque converter 16 could be omitted, and the clutches become the launch device.

The output member 24 of the torque converter 16 rotatably couples to the forward-reverse switching mechanism 18 and serves as an input to the CVT 14. The forward-reverse switching mechanism 18 is provided because the engine 12 is operated in a predetermined single direction. In the specific example of FIG. 1, the forward-reverse switching mechanism 18 includes a simple planetary gear set 26 including a sun gear 28, a ring gear 30 disposed coaxially about the sun gear 28, and a carrier 32 bearing a plurality of pinion gears 34 that mesh with both the sun gear 28 and the ring gear 30. In other variations, a double-pinion planetary gear set could be used, having one set of pinion gears meshing with a second set of pinion gears, the first set of pinion gears meshing with the sun gear 28 and the second set of pinion gears meshing with the ring gear 30. The output member 24 of the torque converter 16 is continuously connected to the ring gear 30, in this example. An input member 36 to the CVT 14 is continuously connected to the sun gear member 28, in this example.

The forward-reverse switching mechanism 18 further includes a forward clutch 38 and a reverse brake 40. The forward clutch 38 is selectively engageable to connect the sun gear 28 and CVT input member 36 to the ring gear 30 and the torque converter output member 24 so that these elements rotate together as a single unit. Accordingly, the engine 12 is then operable to drive the CVT 14 in a forward direction. The reverse brake 40 is selectively engageable to connect the carrier member 32 with a stationary member, such as the transmission housing 42 so that the direction of the input rotation would then be reversed, as applied to the CVT input member 36. It should be understood, however, that the torque converter output member 24 and CVT input member 36, as well as the reverse brake 40 and the forward clutch 38 could be interconnected in a different manner and still achieve forward-reverse switching, without falling beyond the spirit and scope of the present disclosure. For example, other power flows to alternate between forward and reverse could be used, such as alternative configurations using two or three clutches and one, two, or more gear sets. The forward clutch 38 and reverse brake 40 may each be controlled by an actuator, such as a hydraulically controlled actuator, that supplies fluid pressure to the clutch 38 or brake 40.

In this example, the CVT 14 is a belt-type or chain-type CVT that may be advantageously controlled by the control system 60. The CVT 14 includes a variator assembly 44 that transfers torque between the CVT input member 36 and a CVT output member 46. The variator assembly 44 includes a first, or primary pulley 48, a second, or secondary pulley 50, and a continuous rotatable device 52, such as a belt or chain, or any flexible continuous rotating device, that rotatably couples the first and second pulleys 48, 50 to transfer torque therebetween. The first pulley 48 and input member 36 rotate about a first axis A, and the second pulley 50 and output member 46 rotate about a second axis B. One of the first and second pulleys 48, 50 may act as a ratioing pulley to establish a speed ratio and the other of the first and second pulleys 48, 50 may act as a clamping pulley to generate sufficient clamping force to transfer torque. As used herein, the term 'speed ratio' refers to a variator speed ratio, which may be a ratio of a CVT output speed and a CVT input speed. Thus, the distance between the first pulley halves 48a, 48b may be varied (by moving one or more of the pulley halves 48a, 48b along the axis A) to move the continuous member 52 higher or lower within the groove defined between the two pulley halves 48a, 48b. Likewise, the second pulley halves 50a, 50b may also be moved with respect to each other along the axis B to change the ratio or torque-carrying capacity of the CVT 14. One or both pulley halves 48a, 48b, 50a, 50b of each pulley 48, 50 may be moved with an actuator, such as a hydraulically controlled actuator that varies the fluid pressure supplied to the pulleys 48, 50.

The motor vehicle propulsion system 10 preferably includes one or more sensors or sensing devices, such as Hall-effect sensors, for monitoring rotational speeds of various devices (not shown), including, e.g., an engine speed sensor, a torque converter turbine speed sensor, a CVT variator input speed sensor, a CVT variator output speed sensor, and one or more wheel speed sensors. Each of the sensors communicates with the control system 60.

The control system 60 preferably includes at least one controller 62 and may include a user interface 64. A single controller 62 is shown for ease of illustration. The controller 62 may include a plurality of controller devices wherein each of the controllers 62 may be associated with monitoring and controlling a single system. This may include an engine control module (ECM) for controlling the engine 12 and a transmission controller (TCM) for controlling the CVT 14 and for monitoring and controlling a single subsystem, e.g., a torque converter clutch and/or the forward-reverse switching mechanism 18.

The controller 62 preferably includes at least one processor and at least one memory device 66 (or any non-transitory, tangible computer readable storage medium) on which are recorded instructions for executing instruction sets for controlling the CVT 14 and/or the forward clutch 38, and a memory cache 68. The memory device 66 can store controller-executable instruction sets, and the processor can execute the controller-executable instruction sets stored in the memory 66.

The user interface 64 communicates with and monitors operator input devices, such as, for example, an accelerator pedal 70, a brake pedal 72, and a transmission gear selector 74. The user interface 64 determines an operator torque request based upon the aforementioned operator inputs. In one example, the transmission gear selector 74 includes a tap-up/tap-down feature, whereby a vehicle operator may manually select a transmission gear ratio, thus overriding transmission control.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms can include any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The control system 60 of FIG. 2 may be programmed to execute the steps of a method 100, 200 as defined in FIGS. 3-4 and as discussed in greater detail below.

Figure 3:
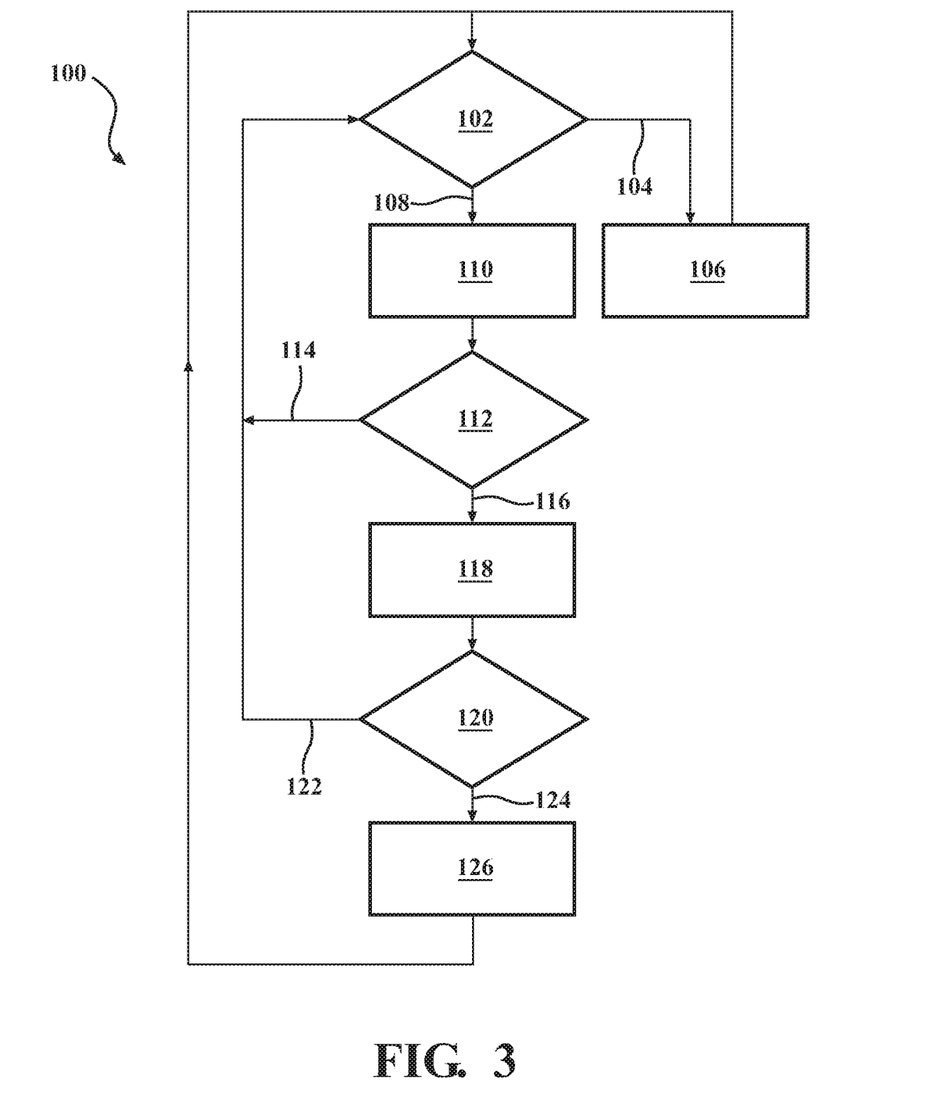
FIG. 3 schematically shows a block diagram of an example CVT control system and method that can be employed to control a clutch of the CVT assembly of FIGS. 1-2, in accordance with the principles of the present disclosure.

Referring now to FIG. 3, a flowchart of one variation of a method 100 stored on an instruction set and executable by the controller 62 of the control system 60 is shown. For example, the method 100 is a method for controlling a continuously variable transmission (CVT) including a variator assembly for a motor vehicle.

The method 100 may begin with step or block 102, where the method 100 (and/or control system 60) includes determining whether a predetermined condition is met for applying a clutch critical pressure to a CVT applied clutch, such as the forward clutch 38. Under a normal clutch control scheme, the forward clutch 38 can be activated with a high pressure, such as full line pressure. The clutch critical pressure to be applied to the forward clutch 38 during certain conditions is less than the high line pressure; in this case, the clutch critical pressure may be called a clutch critical low pressure.

The clutch critical low pressure is a pressure at which the CVT forward clutch 38 is capable to transmit the input torque from engine or back drive engine during engine brake mode but may slip upon experiencing a predetermined excessive disturbance having a predetermined minimum torque level. The clutch critical low pressure may be determined based on an engine torque and a slip feedback control wherein the clutch is maintained at a low slip threshold (such as, e.g., 5 rpm), or at a zero slip threshold, but whereupon experiencing a torque disturbance, the clutch would being to slip or slip at a higher rate. Thus, the clutch critical low pressure may be maintained with a feed forward control.

The predetermined condition for applying the clutch critical low pressure, instead of line pressure, to the forward clutch 38 may include conditions under which the control system 60 determines that the CVT 14 is operating under safe conditions and in an economy mode, a fuel-saving mode, or an optimal clamping control mode. In these conditions, the control system 60 and/or method 100 may determine that it is appropriate or safe to apply a lower clamping control to the CVT 14 in order to save on fuel economy. Another predetermined condition for applying the clutch critical low pressure could be a situation when an auxiliary pump (not shown) is on, which also indicates that the CVT 14 is operating under economy conditions, such as when the vehicle is sailing. As such, if the CVT 14 is operating under a lower clamping force, fuel economy is increased, but the CVT 14 has a greater chance of being damaged by slippage of the continuous member 52 in the pulleys 48, 50 if the CVT 14 experiences a high torque disturbance event. Therefore, the clutch critical low pressure of the forward clutch 38 is designed to allow the forward clutch 38 to slip before the CVT continuous member 52 would slip.

If in step 102, it is determined that the predetermined condition is not met (e.g., the CVT 14 is not operating in an optimal clamping control mode because, for example, high torque events are already occurring, and the auxiliary pump is not on), the method 100 proceeds along path 104 to a step 106. In step 106, normal clutch control is applied, such as the high line pressure being applied to the forward clutch 38. From step 106, the method 100 may then follow a feedback loop back to step 102 to again inquire whether the predetermined condition is met.

If, however, the predetermined condition is met as determined in step 102, the method 100 proceeds along path 108 to a step 110. In step 110, the control system 60 and/or method 100 includes commanding the clutch critical pressure, such as the clutch critical low pressure, to be applied to the CVT forward clutch 38. The method 100 then proceeds from block 110 to a step or block 112, wherein the method 100 and/or control system 60 includes determining whether the CVT forward clutch 38 is slipping beyond a predetermined threshold. The predetermined threshold could be zero or substantially zero, or the predetermined threshold could be another low-level slip threshold, such as 5 or 10 rpm, by way of example. The slip threshold could also have any other desired value.

If, in block 112, it is determined that the CVT forward clutch 38 is not slipping beyond the predetermined slip threshold, the method 100 or control system 60 proceeds along path 114 back to step 102 to again determine whether the predetermined condition is met for applying the clutch critical low pressure. If, however, in block 112, it is determined that the CVT forward clutch 38 is slipping beyond the predetermined threshold, the control system 60 and/or method 100 includes commanding a clutch slip control scheme to be applied to the CVT forward clutch 38 that is configured to bring a clutch slip of the CVT forward clutch 38 under the predetermined slip threshold.

Accordingly, if in block 112, it is determined that the CVT forward clutch 38 is slipping beyond the predetermined threshold, the method 100 may proceed along a path 116 to an optional step 118. In step 118, the control scheme applied by the control system 60 and method 100 includes activating a slip recover decay timer. The slip recovery decay time may be used, for example to set a bound for a decay timeframe under which the clutch slip will be brought back below the predetermined slip threshold. The decay timeframe can be preset to a desired decay timeframe, such as, for example, about 1 or 2 seconds.

In another variation, an optional step of including another timer, such as a slip recovery delay timer, may be included. If the slip recovery delay timer is included, the method 100 or controller will wait for a slip recovery delay timeframe to elapse before implementing the slip recovery scheme and activating the slip recovery decay timer. Therefore, the system 60 could be configured to never implement the slip recovery scheme if the forward clutch slip occurs for such a short timeframe that the slip recovery delay timeframe never elapses before the slippage of the CVT forward clutch 38 ceases or goes below the predetermined slip threshold without intervention. In other words, adding a slip recovery delay timer allows the system 60 to wait for a time lapse threshold before immediately controlling the slip of the forward clutch 38 back down to a non-slip or low-slip condition.

If the slip recovery decay timer is included in step 118, the method 100 then proceeds to step 120, where the control system 60 and/or method 100 include determining whether the slip recovery decay timer has been activated and the forward clutch 38 is still slipping beyond the predetermined slip threshold.

If, in step 120, it is determined that the slip recovery decay timer has not been activated and/or the forward clutch 38 is no longer slipping, the method 100 proceeds from block 120 along path 122 back to step 102 to again determine whether the predetermined condition is present for applying the clutch critical low pressure. If, however, the conditions in block 120 are met (the slip recovery decay timer has been activated and the forward clutch 38 is slipping), the method 100 proceeds along path 124 to step 126.

In step 126, the method 100 and control system 60 include commanding a clutch slip control scheme to be applied to the CVT forward clutch 38 that is configured to bring a clutch slip of the CVT forward clutch 38 under the predetermined threshold. If the slip recovery decay timer is used, the clutch slip control scheme includes bringing the slip of the forward clutch 38 under the predetermined threshold within the bounds of the decay timeframe.

The clutch slip control scheme may include implementing a feedback control scheme within the decay timeframe bound by the slip recovery decay timer. In some variations, the feedback control scheme includes implementing a proportional-integral-derivative (PID) control scheme to bring the clutch slip of the CVT forward clutch under the predetermined threshold within the decay timeframe. The feedback control scheme may be a closed loop control scheme, by way of example. The method 100 may then return from step 126 back to step 102.

Figure 4:
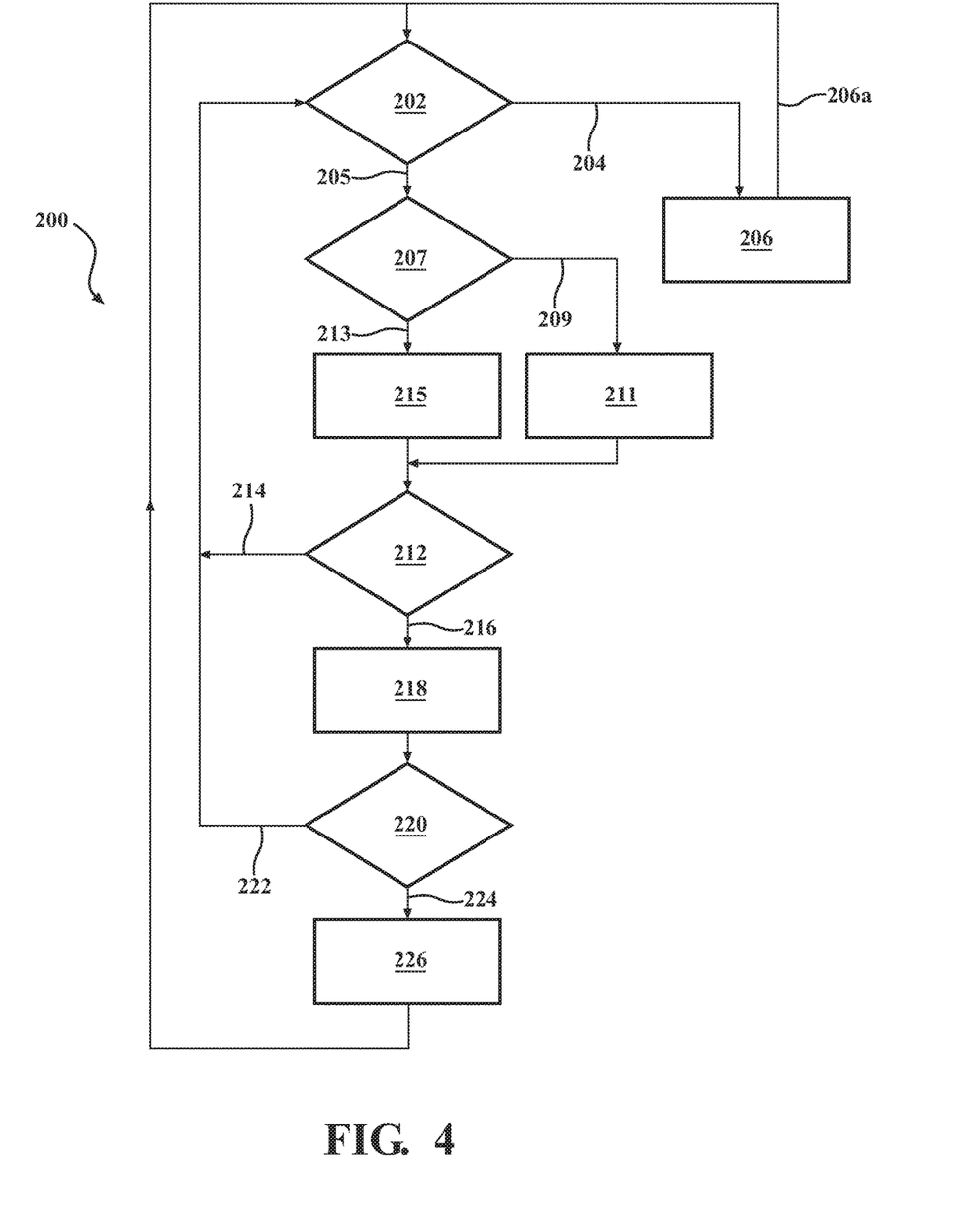
FIG. 4 schematically shows a block diagram of another example CVT control system and method that can be employed to control a clutch of the CVT assembly of FIGS. 1-2, in accordance with the principles of the present disclosure.

Referring now to FIG. 4, a flowchart of another variation of a method 200 stored on an instruction set and executable by the controller 62 of the control system 60 is shown.

For example, the method 200 is also a method for controlling a forward clutch of a continuously variable transmission (CVT) including a variator assembly for a motor vehicle, such as the CVT 14 and forward clutch 38 described above.

The method 200 includes some steps that are similar to those of method 100, and the similar steps are designated by reference numerals incremented by 100. For example, like method 100 of FIG. 3, the method 200 of FIG. 4 may begin with a step or block 202, where the method 200 (and/or control system 60) includes determining whether a predetermined condition is met for applying a clutch critical pressure to a CVT forward clutch, such as forward clutch 38. The clutch critical pressure may be a clutch critical low pressure or a clutch critical high pressure, both of which are less than the higher line pressure. The clutch critical pressures (low and high) are pressures at which the CVT forward clutch 38 may slip upon experiencing a predetermined minimum or medium torque disturbance level, respectively. The predetermined condition for applying one of the clutch critical pressures, instead of line pressure, to the forward clutch 38 may be in conditions under which the control system 60 determines that the CVT 14 is operating under safe conditions and in an economy mode, a fuel-saving mode, or an optimal clamping control mode. In these conditions, the control system 60 and/or method 200 may determine that it is appropriate or safe to apply a lower clamping control to the CVT 14 in order to save on fuel economy. Another predetermined condition for applying a clutch critical pressure is when an auxiliary pump (not shown) is on, which also indicates that the CVT 14 is operating under economy conditions, such as when the vehicle is sailing. As such, if the CVT 14 is operating under a lower clamping force, fuel economy is increased, but the CVT 14 has a greater chance of being damaged by slippage of the continuous member 52 in the pulleys 48, 50 if the CVT 14 experiences a high torque event. Therefore, the clutch critical pressure of the forward clutch 38 is designed to allow the forward clutch 38 to slip before the CVT continuous member 52 would slip.

If in step 202, it is determined that the predetermined condition is not met (e.g., the CVT 14 is not operating in an optimal clamping control mode because, for example, high torque events are already occurring, and/or the auxiliary pump is not on), the method 200 proceeds along path 204 to a step 206. In step 206, normal clutch control is applied, such as the high line pressure being applied to the forward clutch 38. From step 206, the method 200 may then follow a feedback loop 206a back to step 202 to again inquire whether the predetermined condition is met.

If, however, the predetermined condition is met as determined in step 202, the method 200 proceeds along a path 205 to a step 207. In step 207, the method 200 and/or control system 60 determines whether a rough road condition is detected. Step or block 207 determines a rough road status of the vehicle. In some variations, the rough road status determined in block 207 is a mild rough road status, as a major rough road status may be determined in step 202 as a condition under which normal clutch control should be applied in step 206. In other words, if the road is very rough, the CVT 14 will be clamped at a high pressure, and the pressure applied to the forward clutch 38 may also be a high pressure, such as full line pressure.

The rough road status, or mild rough road status, may be determined as being positive or negative in step 207. If the rough road status is determined as being positive in step 207, the method 200 includes following a path 209 to a block 211. In block 211, a clutch critical high pressure is commanded to be applied to the forward clutch 38. The clutch critical high pressure is greater than a clutch critical low pressure and less than the line pressure. The clutch critical high pressure is a pressure at which the CVT forward clutch 38 may slip upon experiencing a predetermined medium torque level, the predetermined medium torque level being greater than the predetermined minimum torque level.

A positive rough road status includes at least one of the following: a predetermined number of bumps in a bump threshold timeframe; a wheel slip magnitude exceeding a wheel slip magnitude threshold for longer than a holding timeframe; a predetermined number of wheel slip detections in a rough road timeframe, the wheel slip detections being instances wherein the wheel slip magnitude exceeds the wheel slip magnitude threshold; and vehicle acceleration exceeding a predetermined acceleration threshold.

Thus, the rough road condition may include situations where variable torque disturbances continue to occur over a period of time. The rough road condition could be caused by a rough dirt road, or an icy road. Such conditions may also be referred to as variable mu conditions, because the surface friction varies. During variable mu events (i.e., changing road surface friction), the control system 60 may detect a series of torque disturbances, for example, in the form of discrete wheel slip events. Once these events are over, wheel slip quickly decreases, which may cause an inertia spike in the CVT 14. On certain road conditions, this may continue to occur without exceeding a wheel slip threshold between events. Each wheel slip event may occur for a very short time. Therefore, in such cases, the control system 60 may be configured to keep count of these wheel slip events, and if a certain number of these events occur, determine a positive rough road status.

In rough road conditions, in some variations, it may be desirable to hold the CVT clamping pressure to a level above the low optimal clamping pressure, but at a pressure that is not as high as a maximum clamping pressure. This puts the CVT clamping pressure at a higher amount, which is easier to increase if greater torque disturbances then occur.

If in step 207, it is determined that the rough road status is negative, the method 200 proceeds from step 207 along path 213 to a step or block 215. In block 215, the method 200 and/or control system 60 command a clutch critical low pressure to be applied to the CVT forward clutch 38. The clutch critical low pressure is a pressure at which the CVT forward clutch 38 may slip upon experiencing a predetermined minimum torque level. In this example, the clutch critical low pressure is less than both the clutch critical high pressure and the line pressure.

The method 200 from proceeds from either block 211 or block 215 to a step or block 212, wherein the method 200 and/or control system 60 includes determining whether the CVT forward clutch 38 is slipping beyond a predetermined threshold. The predetermined threshold could be zero or substantially zero, or the predetermined threshold could be another low-level slip threshold, such as 5 or 10 rpm, by way of example.

If, in block 212, it is determined that the CVT forward clutch 38 is not slipping beyond the predetermined threshold, the method 200 or control system 60 proceeds along path 214 back to step 202 to again determine whether the predetermined condition is met for applying one of the clutch critical pressures (low or high). If, however, in block 212, it is determined that the CVT forward clutch 38 is slipping beyond the predetermined threshold, the control system 60 and/or method 200 includes commanding a clutch slip control scheme to be applied to the CVT forward clutch 38 that is configured to bring a clutch slip of the CVT forward clutch 38 under the predetermined slip threshold.

Accordingly, if in block 212, it is determined that the CVT forward clutch 38 is slipping beyond the predetermined threshold, the method 200 may proceed along a path 216 to an optional step 218. In step 218, the control scheme applied by the control system 60 and method 200 includes activating a slip recover decay timer. The slip recovery decay time may be used, for example to set a bound for a decay timeframe under which the clutch slip will be brought back below the predetermined slip threshold. The decay timeframe can be preset to a desired decay timeframe, such as, for example, about 1 or 2 seconds.

In another variation, an optional step of including another timer, such as a slip recovery delay timer, may be included, as described above with respect to method 100. For example, if the slip recovery delay timer is included, the method 200 or controller 62 will wait for a slip recovery delay timeframe to elapse before implementing the slip recovery scheme and activating the slip recovery decay timer. Therefore, the system 60 could be configured to never implement the slip recovery scheme if the slip occurs for such a short timeframe that the slip recovery delay timeframe never elapses before the slippage of the CVT forward clutch 38 ceases or goes below the predetermined slip threshold without intervention. In other words, adding a slip recovery delay timer allows the system 60 to wait for a time lapse threshold before immediately controlling the slip of the forward clutch 38 back down to a non-slip or low-slip condition.

If the slip recovery decay timer is included in step 218, the method 200 then proceeds to step 220, where the control system 60 and/or method 200 includes determining whether the slip recovery decay timer has been activated and the forward clutch 38 is still slipping beyond the predetermined slip threshold.

If, in step 220, it is determined that the slip recovery decay timer has not been activated and/or the forward clutch 38 is no longer slipping, the method 200 proceeds from block 220 along path 222 back to step 202 to again determine whether the predetermined condition is present for applying the clutch critical pressure (clutch critical low pressure or clutch critical high pressure). If, however, the conditions in block 220 are met (the slip recovery decay timer has been activated and the forward clutch 38 is slipping), the method 200 proceeds along path 224 to step 226.

In step 226, the method 200 and control system 60 include commanding a clutch slip control scheme to be applied to the CVT forward clutch 38 that is configured to bring a clutch slip of the CVT forward clutch 38 under the predetermined threshold. If the slip recovery decay timer is used, the clutch slip control scheme includes bringing the slip of the forward clutch 38 under the predetermined threshold within the bounds of the decay timeframe.

The clutch slip control scheme may include implementing a feedback control scheme within the decay timeframe bound by the slip recovery decay timer. In some variations, the feedback control scheme includes implementing a proportional-integral-derivative (PID) control scheme to bring the clutch slip of the CVT forward clutch under the predetermined threshold within the decay timeframe. The method 200 may then return from step 226 back to step 202.

While the clutch critical low pressure or clutch critical high pressure is commanded to be applied to the forward clutch 38 in methods 100 or 200, the methods 100, 200 may also optionally include commanding an optimal clamping pressure to be applied the variator assembly 44 of the CVT 14. The optimal clamping pressure may be lower than an elevated clamping pressure that would be used under high torque events. The optimal clamping pressure is based on the critical torque capacity of the CVT 14, including the pulleys 48, 50 and torque carrying member 52 (belt or chain), which has a narrow safety factor, for example. In other cases, an elevated clamping pressure may be applied to the CVT 14, such as when a torque disturbance is predicted to occur, or is occurring, with the CVT output. Such a condition indicates that additional torque carrying capacity is needed, or will soon be needed, by the CVT 14. In one example, the control system 60 monitors a loss of vehicle traction such as a wheel slip event or the like, which could occur if one of the driving wheels is not in contact with the road surface, such as when hitting a pothole, or if the one of the driving wheels is in contact with a low-friction surface, such as ice. In such cases, the elevated clamping pressure may be applied. Typically, the steps 102, 202 would then direct the system 60 to normal clutch control in blocks 106, 206; but in some variations and circumstances, the optimal clutch control may be applied along paths 104, 204.

The control system 60 may be configured to execute each of the steps illustrated in FIGS. 3-4. Thus, the entire description of FIGS. 3-4 may be applied to the control system 60 to effectuate the methods 100, 200. Furthermore, the controller 62 may be or include a transmission controller that includes a number of control logics that are configured to execute the steps of the methods 100, 200 explained above.

The controller 62 of the control system 60 may include a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some examples for carrying out the claimed disclosure have been described in detail, various alternative designs and examples exist for practicing the disclosure defined in the appended claims. Furthermore, the examples shown in the drawings or the characteristics of various examples mentioned in the present description are not necessarily to be understood as examples independent of each other. Rather, it is possible that each of the characteristics described in one of the examples of an example can be combined with one or a plurality of other desired characteristics from other examples, resulting in other examples not described in words or by reference to the drawings. Accordingly, such other examples fall within the framework of the scope of the appended claims.

What is claimed is:

1. A method for controlling a clutch of a continuously variable transmission (CVT) including a variator assembly for a motor vehicle, the method comprising:
   determining whether a predetermined condition is met for applying a clutch critical pressure to the clutch, the clutch critical pressure being less than a line pressure, the clutch critical pressure being a pressure at which the clutch may slip upon experiencing a predetermined minimum torque disturbance level;
   if the predetermined condition is met, commanding the clutch critical pressure to be applied to the clutch;
   determining whether the clutch is slipping beyond a predetermined threshold; and
   if the clutch is slipping beyond the predetermined threshold, commanding a clutch slip control scheme to be applied to the clutch that is configured to bring a clutch slip of the clutch under the predetermined threshold,
   wherein the step of commanding the clutch slip control scheme comprises activating a slip recovery decay timer.

2. The method of claim 1, wherein the step of commanding the clutch slip control scheme includes implementing a feedback control scheme within a decay timeframe bound by the slip recovery decay timer.

3. The method of claim 2, wherein implementing the feedback control scheme includes implementing a proportional-integral-derivative (PID) control scheme to bring the clutch slip of the clutch under the predetermined threshold within the decay timeframe.

4. The method of claim 3, wherein the predetermined condition includes at least one of the following: the CVT being in an optimal clamping control mode and an auxiliary pump being on.

5. The method of claim 4, wherein the step of commanding the clutch critical pressure to be applied to the clutch includes maintaining the clutch critical pressure by applying a slip feedback control.

6. The method of claim 5, further comprising determining a rough road status of the vehicle, the clutch critical pressure being a clutch critical low pressure, the method further comprising commanding a clutch critical high pressure to be applied to the clutch if the rough road status of the vehicle is positive and the predetermined condition is met, the clutch critical high pressure being greater than the clutch critical low pressure and less than the line pressure, the clutch critical high pressure being a pressure at which the clutch may slip upon experiencing a predetermined medium torque disturbance level, the predetermined medium torque disturbance level being greater than the predetermined minimum torque disturbance level.

7. The method of claim 6, wherein a positive rough road status includes at least one of the following: a predetermined number of bumps in a bump threshold timeframe; a wheel slip magnitude exceeding a wheel slip magnitude threshold for longer than a holding timeframe; a predetermined number of wheel slip detections in a rough road timeframe, the wheel slip detections being instances wherein the wheel slip magnitude exceeds the wheel slip magnitude threshold; and vehicle acceleration exceeding a predetermined acceleration threshold.

8. A transmission control system for controlling a clutch of a continuously variable transmission (CVT) having a variator assembly, the transmission control system comprising an instruction set, the instruction set executable to:
   determine whether a predetermined condition is met for applying a clutch critical pressure to the clutch, the clutch critical pressure being less than a line pressure, the clutch critical pressure being a pressure at which the clutch may slip upon experiencing a predetermined minimum torque disturbance level;
   command the clutch critical pressure to be applied to the clutch if the predetermined condition is met;

determine whether the clutch is slipping beyond a predetermined threshold; and if the clutch is slipping beyond the predetermined threshold, command a clutch slip control scheme to be applied to the clutch that is configured to bring a clutch slip of the clutch under the predetermined threshold, wherein the transmission control system is configured to activate a slip recovery decay timer as part of the clutch slip control scheme.

9. The transmission control system of claim 8, wherein, as part of the clutch control scheme, the transmission control system is configured to implement a feedback control scheme within a decay timeframe bound by the slip recovery decay timer.

10. The transmission control system of claim 9, wherein, as part of the clutch control scheme, the transmission control system is configured to implement a proportional-integral-derivative (PID) control scheme to bring the clutch slip of the clutch under the predetermined threshold within the decay timeframe.

11. The transmission control system of claim 10, wherein the predetermined condition includes at least one of the following: the CVT being in an optimal clamping control mode and an auxiliary pump being on.

12. The transmission control system of claim 11, wherein the transmission control system is configured to command the clutch critical pressure to be applied to the clutch by maintaining the clutch critical pressure through applying a slip feedback control.

13. The transmission control system of claim 12, wherein the transmission control system is configured to determine a rough road status of the vehicle, the clutch critical pressure being a clutch critical low pressure, the transmission control system being configured to command a clutch critical high pressure to be applied to the forward clutch if the rough road status of the vehicle is positive and the predetermined condition is met, the clutch critical high pressure being greater than the clutch critical low pressure and less than the line pressure, the clutch critical high pressure being a pressure at which the clutch may slip upon experiencing a predetermined medium torque disturbance level, the predetermined medium torque disturbance level being greater than the predetermined minimum torque disturbance level, wherein a positive rough road status includes at least one of the following: a predetermined number of bumps in a bump threshold timeframe; a wheel slip magnitude exceeding a wheel slip magnitude threshold for longer than a holding timeframe; a predetermined number of wheel slip detections in a rough road timeframe, the wheel slip detections being instances wherein the wheel slip magnitude exceeds the wheel slip magnitude threshold; and vehicle acceleration exceeding a predetermined acceleration threshold.

14. A continuously variable transmission (CVT) for a motor vehicle, comprising:

a variator assembly including a first pulley and a second pulley, the first and second pulleys rotatably coupled by a continuous rotatable device, wherein the second pulley is rotatably coupled to an output member;

the first pulley including a first moveable sheave that is translatable along a first axis relative to a first stationary sheave in response to urging of a first actuator;

the second pulley including a second moveable sheave that is translatable along a second axis relative to a second stationary sheave in response to urging of a second actuator;

a clutch selectively engageable to couple the first pulley to an input member to place the CVT in a forward mode of operation; and a control system having at least one controller and one or more sensors in communication with the controller, the control system including an instruction set, the instruction set executable to:

determine whether a predetermined condition is met for applying a clutch critical pressure to the clutch, the clutch critical pressure being less than a line pressure, the clutch critical pressure being a pressure at which the clutch may slip upon experiencing a predetermined minimum torque disturbance level;

command the clutch critical pressure to be applied to the clutch if the predetermined condition is met determine whether the clutch is slipping beyond a predetermined threshold; and if the clutch is slipping beyond the predetermined threshold, command a clutch slip control scheme to be applied to the clutch that is configured to bring a clutch slip of the clutch under the predetermined threshold, wherein, as part of the clutch slip control scheme, the transmission control system is configured to activate a slip recovery decay timer and implement a feedback control scheme within a decay timeframe bound by the slip recovery decay timer.

15. The CVT of claim 14, wherein the transmission control system is configured to implement a proportional-integral-derivative (PID) control scheme to bring the clutch slip of the forward clutch under the predetermined threshold within the decay timeframe as part of the feedback control scheme.

16. The CVT of claim 15, wherein the predetermined condition includes at least one of the following: the CVT being in an optimal clamping control mode and an auxiliary pump being on, and wherein the transmission control system is configured to command the clutch critical pressure to be applied to the clutch by maintaining the clutch critical pressure through applying a slip feedback control.

17. The CVT of claim 16, the clutch critical pressure being a clutch critical low pressure, wherein the transmission control system is configured to determine a rough road status of the vehicle, the transmission control system being further configured to command a clutch critical high pressure to be applied to the clutch if the rough road status of the vehicle is positive and the predetermined condition is met, the clutch critical high pressure being greater than the clutch critical low pressure and less than the line pressure, the clutch critical high pressure being a pressure at which the clutch may slip upon experiencing a predetermined medium torque disturbance level, the predetermined medium torque disturbance level being greater than the predetermined minimum torque disturbance level, wherein a positive rough road status includes at least one of the following: a predetermined number of bumps in a bump threshold timeframe; a wheel slip magnitude exceeding a wheel slip magnitude threshold for longer than a holding timeframe; a predetermined number of wheel slip detections in a rough road timeframe, the wheel slip detections being instances wherein the wheel slip magnitude exceeds the wheel slip magnitude threshold; and vehicle acceleration exceeding a predetermined acceleration threshold.

* * * * *